US012104567B1

(12) United States Patent

Barnes

(10) Patent No.: US 12,104,567 B1
(45) Date of Patent: Oct. 1, 2024

(54) SELF-CONTAINED HYDROELECTRICITY GENERATING SYSTEM

(71) Applicant: Arthur James Barnes, Miami, FL (US)

(72) Inventor: Arthur James Barnes, Miami, FL (US)

( * ) Notice: Subject to any disclaimer, the term of this patent is extended or adjusted under 35 U.S.C. 154(b) by 0 days.

(21) Appl. No.: 18/075,525

(22) Filed: Dec. 6, 2022

Related U.S. Application Data

(60) Provisional application No. 63/288,102, filed on Dec. 10, 2021.

(51) Int. Cl.
*F03B 17/00* (2006.01)
*F03B 13/00* (2006.01)
*F03B 13/06* (2006.01)
*F03B 17/06* (2006.01)

(52) U.S. Cl.
CPC .............. *F03B 17/06* (2013.01); *F03B 13/00* (2013.01); *F03B 13/06* (2013.01)

(58) Field of Classification Search
CPC ................................ F03B 17/06; F03B 13/00
See application file for complete search history.

(56) References Cited

U.S. PATENT DOCUMENTS

| | | | |
|---|---|---|---|
| 10,359,027 B2 | 7/2019 | Barakat | |
| 2009/0058092 A1 * | 3/2009 | Chen | F03B 17/005 290/54 |
| 2009/0097961 A1 | 4/2009 | Nightinagle | |
| 2010/0327581 A1 | 12/2010 | Baarman et al. | |
| 2013/0088190 A1 | 4/2013 | Kang et al. | |
| 2022/0213860 A1 * | 7/2022 | Kim | F03B 3/04 |

FOREIGN PATENT DOCUMENTS

| | | | | |
|---|---|---|---|---|
| CN | 102536602 A | | 7/2012 | |
| CN | 103597207 A | * | 2/2014 | F03B 13/06 |
| CN | 204827775 U | | 12/2015 | |
| CN | 105113592 B | | 3/2017 | |
| CN | 206539450 U | | 10/2017 | |
| ES | 2759174 A2 | * | 5/2020 | |
| KR | 101959850 B1 | | 3/2019 | |
| WO | WO2012165789 A2 | | 12/2012 | |
| WO | WO2013055061 A1 | | 4/2013 | |
| WO | WO2018067076 A1 | | 4/2018 | |

* cited by examiner

*Primary Examiner* — Julio C. Gonzalez
(74) *Attorney, Agent, or Firm* — John Rizvi; John Rizvi, P.A.—The Patent Professor®

(57) ABSTRACT

A self-contained hydroelectricity generating system to produce an amount of usable electrical energy has primary and secondary cisterns containing a motive fluid. A hydro-expeditor tower assembly includes a plurality of spiral hydro-expeditor towers each disposed in fluid communication with the primary cistern, a portion of the motive fluid flows from the primary cistern into and through each of the hydro-expeditor towers increasing the velocity thereof. A hydroelectric generator assembly has a plurality of hydroelectric generator units each disposed in fluid communication with a corresponding spiral hydro-expeditor tower, the motive fluid discharged from each of the spiral hydro-expeditor towers contacts the turbine of a corresponding hydroelectric generator unit resulting in generation of the amount of usable electrical energy. The motive fluid from the hydroelectric generator units is discharged into the secondary cistern and is then transferred to the primary cistern for reuse through the system.

19 Claims, 4 Drawing Sheets

SELF-CONTAINED HYDROELECTRICITY GENERATING SYSTEM

CROSS-REFERENCE TO RELATED APPLICATIONS

This application claims the benefit of U.S. Provisional Patent Application Ser. No. 63/288,102 filed on Dec. 10, 2021, which is incorporated by reference herein in its entirety.

FIELD OF THE INVENTION

The present invention relates generally to a self-contained hydroelectricity generating system to produce an amount of usable electrical energy.

BACKGROUND OF THE INVENTION

After years of highly contested and heated public debates as to whether or not climate change or global warming existed at all, these concepts are now deeply embedded on the lips of politicians around the world. Furthermore, climate change and global warming are the rallying cries for countless non-governmental organizations demanding change and/or seeking alternatives to curb the impending onslaught of sea level rise, fishery collapse, increasingly unstable weather patterns. etc., which are the immediate and potentially irreversible effects of mankind's insatiable thirst for electricity.

A major contributor to the global warming crisis is known to be continued reliance on burning fossil fuels to produce a significant portion of the electrical energy used worldwide. Current estimates indicate that nearly 40% of the electricity produced in the United States today is generated from burning natural gas, i.e., methane, and another 20% is produced by burning coal. Less than 10% of the electricity currently generated in the United States is derived from hydroelectric generating facilities. Hydroelectric generating facilities are reported to account for about 17% of electrical energy consumed worldwide, with China being the largest producer of hydroelectric energy.

While hydroelectric generating facilities do not create the hydrocarbon byproducts which are at the heart of the global warming crisis, hydroelectric generating facilities do not come without their own form of negative environmental impacts. It is generally understood that hydroelectric generating systems rely on some form of a dam which at a minimum impedes, if not completely stops altogether, the natural flow of a river or stream in which it is installed. Massive reservoirs of water held up behind a concrete dam, often situated between looming canyon walls, such as the Hoover Dam on the Nevada-Arizona border, is an image most American citizens will recognize and will equate with so-called "clean-energy."

Most hydroelectric generating facilities in operation today rely upon one of four common types of dam systems. These include buttress dams, gravity dams, embankment dams, and arch dams, such as the Hoover Dam noted above. As also noted above, each of these dam systems results in impeding the natural flow of the river or stream across which it is constructed.

While the advantages of hydroelectric generating facilities versus fossil fuel-based electricity generation plants are obvious, by impending or diverting natural water flow brings its own set of environmental impacts. Many people have seen video of salmon or trout swimming upstream against currents to return to their original spawning grounds, and many are also likely familiar with the concept of a "fish ladder" which allows the fish to navigate their way around massive dam structures. However, the impediment of the dam itself, as well as the changes to the course and flow of rivers and streams has negatively impacted the health of several salmon and other migratory fish species, and in some cases, these impacts are significant.

Further, the diversion of the natural flow of water in a river or stream impacts the environment both upstream and downstream of a dam structure, for example, by displacing populations upstream of a dam to make room for reservoirs and new high water river levels, such as was experienced on a massive scale during construction of the Three Gorges Dam on the Yangtze River in Yichang. China. Downstream impacts include depriving human and animal populations of the water resources relied upon for centuries or more to survive, as well as decreasing or eliminating the amount of water available for use in agriculture, or to simply support the native flora in a given location of a river basis.

More recently, in view of the ongoing drought being experienced in the western United States, as well as the seemingly more frequent instances of massive wildfires, the demand for additional water resources to meet increasing needs for agricultural and metropolitan area growth often exceed the available water resources. As a result, water rights which were once taken for granted are now more frequently becoming hotly debated legal issues, some of which simply may not have workable solutions.

Accordingly, there is an established need for improvements to one or more of the aforementioned shortcomings in the current state of the art.

SUMMARY OF THE INVENTION

The present invention is directed generally to a self-contained hydroelectricity generating system to produce an amount of usable electrical energy.

In a first implementation of the present invention, a self-contained hydroelectricity generating system to produce an amount of usable electrical energy may comprise: a cistern assembly comprising a primary cistern and a secondary cistern, the primary cistern dimensioned to contain an amount of a motive fluid therein; a hydro-expeditor tower assembly having at least one spiral hydro-expeditor tower disposed in fluid communication with the primary cistern, a portion of the amount of the motive fluid flows from the primary cistern into the at least one hydro-expeditor tower, wherein a velocity of the portion of the amount of the motive fluid increases as it flows downward through the at least one hydro-expeditor tower; a hydroelectric generator assembly comprising at least one hydroelectric generator unit having a turbine and a hydroelectric generator comprising a rotor disposed in an electrical generating arrangement with a stator; the hydroelectric generator assembly disposed in fluid communication with the hydro-expeditor tower assembly, the portion of the amount of the motive fluid is discharged from the hydro-expeditor tower assembly into contact with the turbine causing rotation thereof; the turbine is disposed in an operative engagement with the hydroelectric generator at least partially defined by the rotor interconnected to the turbine such that the rotor rotates with the turbine, rotation of the rotor disposed in the electrical generating arrangement with the stator generates the amount of usable electrical energy; the secondary cistern disposed in fluid communication with the hydroelectric generator assembly, the portion of the amount of the motive fluid is discharged from the hydroelectric generator assembly to the secondary cistern after contacting the turbine; and, the portion of the amount of the motive fluid is transferred from the secondary cistern to the primary cistern for reuse.

In a second aspect, the self-contained hydroelectricity generating system can include a motive fluid which is water.

In another aspect, the self-contained hydroelectricity generating system may have a motive fluid is fresh water.

In a further aspect, the self-contained hydroelectricity generating system can include a primary cistern dimensioned to contain about ten million gallons to about fifty million gallons of a motive fluid.

In one other aspect, the self-contained hydroelectricity generating system may have a fire control system wherein a fire control portion of an amount of a motive fluid in a cistern assembly is utilized for the fire control system.

In yet another aspect, the self-contained hydroelectricity generating system can include a drought relief system wherein a drought relief portion of an amount of a motive fluid in a cistern assembly is utilized for the drought relief system In still one further aspect, the self-contained hydroelectricity generating system may have a secondary cistern dimensioned to contain about five million gallons to about twenty million gallons of a portion of a motive fluid.

In yet one other aspect, the self-contained hydroelectricity generating system can include at least one spiral hydro-expeditor tower having an expeditor conduit arranged in a downward spiral configuration with a predetermined downward pitch between a top of the at least one spiral hydro-expeditor tower to a bottom of the at least one spiral hydro-expeditor tower.

In still another aspect, the self-contained hydroelectricity generating system may have at least one spiral hydro-expeditor tower including a vertical elevation of about seventy feet from a top to a bottom.

In yet one further aspect, the self-contained hydroelectricity generating system can include at least one spiral hydro-expeditor tower having a predetermined downward pitch of about ten degrees.

In still one other aspect, the self-contained hydroelectricity generating system may have an expeditor conduit including an expeditor inlet disposed proximate a top of at least one spiral hydro-expeditor tower and an expeditor outlet disposed proximate a bottom of the at least one spiral hydro-expeditor tower.

In yet another aspect, the self-contained hydroelectricity generating system can include at least one spiral hydro-expeditor tower having a discharge nozzle mounted to an expeditor outlet to further accelerate a velocity of a portion of an amount of a motive fluid discharged therethrough.

In still one further aspect, the self-contained hydroelectricity generating system may have at least one spiral hydro-expeditor tower including an expeditor conduit with an inner diameter of about twelve inches.

In yet one other aspect, the self-contained hydroelectricity generating system can include at least one spiral hydro-expeditor tower having a discharge nozzle with a discharge aperture diameter of about two inches.

In at least one other implementation of the present invention, a self-contained hydroelectricity generating system to produce an amount of usable electrical energy may comprise: a cistern assembly comprising a primary cistern and a secondary cistern, the primary cistern dimensioned to contain an amount of a motive fluid therein; a hydro-expeditor tower assembly having a plurality of spiral hydro-expeditor towers each disposed in fluid communication with the primary cistern, a portion of the amount of the motive fluid flows from the primary cistern into each of the plurality of hydro-expeditor towers, wherein a velocity of a corresponding portion of the amount of the motive fluid increases as it flows through each of the plurality of hydro-expeditor towers; a hydroelectric generator assembly comprising a plurality of hydroelectric generator units each having a turbine and an electrical generator comprising a rotor disposed in an electrical generating arrangement with a stator; the hydroelectric generator assembly disposed in fluid communication with the hydro-expeditor tower assembly, the corresponding portion of the amount of the motive fluid is discharged from each of the plurality of spiral hydro-expeditor towers into contact with the turbine of a corresponding one of the plurality of hydroelectric generator units causing rotation thereof; each the turbine is disposed in an operative engagement with a corresponding one of the hydroelectric generators, wherein the operative engagement is at least partially defined by each the rotor interconnected to a corresponding one of the turbines such that the rotor rotates with the turbine, and rotation of each the rotor disposed in the electrical generating arrangement with a corresponding one of the stators results in generation of the amount of usable electrical energy; the secondary cistern disposed in fluid communication with the hydroelectric generator assembly, the corresponding portion of the amount of the motive fluid is discharged from each of the plurality of hydroelectric generator units to the secondary cistern after contacting the turbine corresponding therewith; and, each the corresponding portion of the amount of the motive fluid is transferred from the secondary cistern to the primary cistern.

In yet one further aspect, the self-contained hydroelectricity generating system can include a hydro-expeditor tower assembly having forty spiral hydro-expeditor towers.

In still one other aspect, the self-contained hydroelectricity generating system may have a hydroelectric generator assembly including forty hydroelectric generator units.

In yet one further implementation of the present invention, a self-contained hydroelectricity generating system to produce an amount of usable electrical energy may comprise: a cistern assembly comprising a primary cistern and a secondary cistern, the primary cistern dimensioned to contain an amount of a motive fluid therein; a hydro-expeditor tower assembly having a plurality of spiral hydro-expeditor towers each disposed in fluid communication with the primary cistern, a portion of the amount of the motive fluid flows from the primary cistern into each of the plurality of hydro-expeditor towers, wherein a velocity of a corresponding portion of the amount of the motive fluid increases as it flows through each of the plurality of hydro-expeditor towers; a hydroelectric generator assembly comprising a plurality of hydroelectric generator units each having a turbine and an electrical generator comprising a rotor disposed in an electrical generating arrangement with a stator; the hydroelectric generator assembly disposed in fluid communication with the hydro-expeditor tower assembly, the corresponding portion of the amount of the motive fluid is discharged from each of the plurality of spiral hydro-expeditor towers into contact with the turbine of a corresponding one of the plurality of hydroelectric generator units causing rotation thereof; each the turbine is disposed in an operative engagement with a corresponding one of the hydroelectric generators, wherein the operative engagement is at least partially defined by each the rotor interconnected to a corresponding one of the turbines such that the rotor rotates with the turbine, and rotation of each the rotor disposed in the electrical generating arrangement with a corresponding one of the stators results in generation of the amount of usable electrical energy: the secondary cistern disposed in fluid communication with the hydroelectric generator assembly, the corresponding portion of the amount of the motive fluid is discharged from each of the plurality of hydroelectric generator units to the secondary cistern after contacting the turbine corresponding therewith; each the corresponding portion of the amount of the motive fluid is transferred from the secondary cistern to a desalination assembly; and, each the corresponding portion of the amount of the motive fluid is transferred from the desalination assembly to the primary cistern after desalination thereof.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”. “left”, “rear”, “right”. “front”, “vertical”, “horizontal”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a self-contained hydroelectricity generating system to produce an amount of usable electrical energy, generally shown as at 100 throughout the figures. In at least one embodiment, the present invention is directed toward a self-contained hydroelectricity generating system 100 to produce an amount of usable clean renewable electrical energy.

Figure 1:
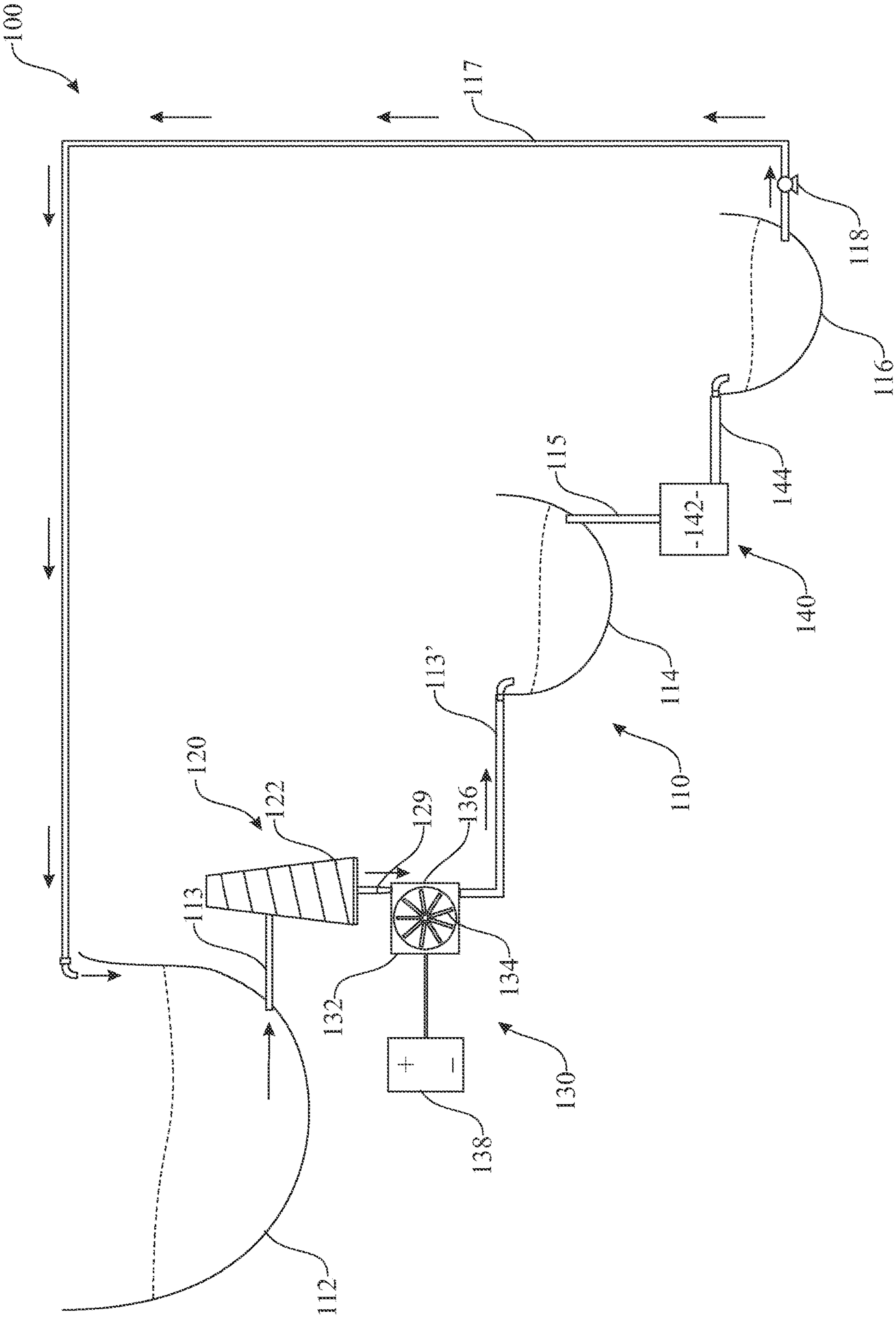
FIG. 1 presents an elevation of one illustrative embodiment of a self-contained hydroelectricity generating system, in accordance with the present invention.
Figure 2:
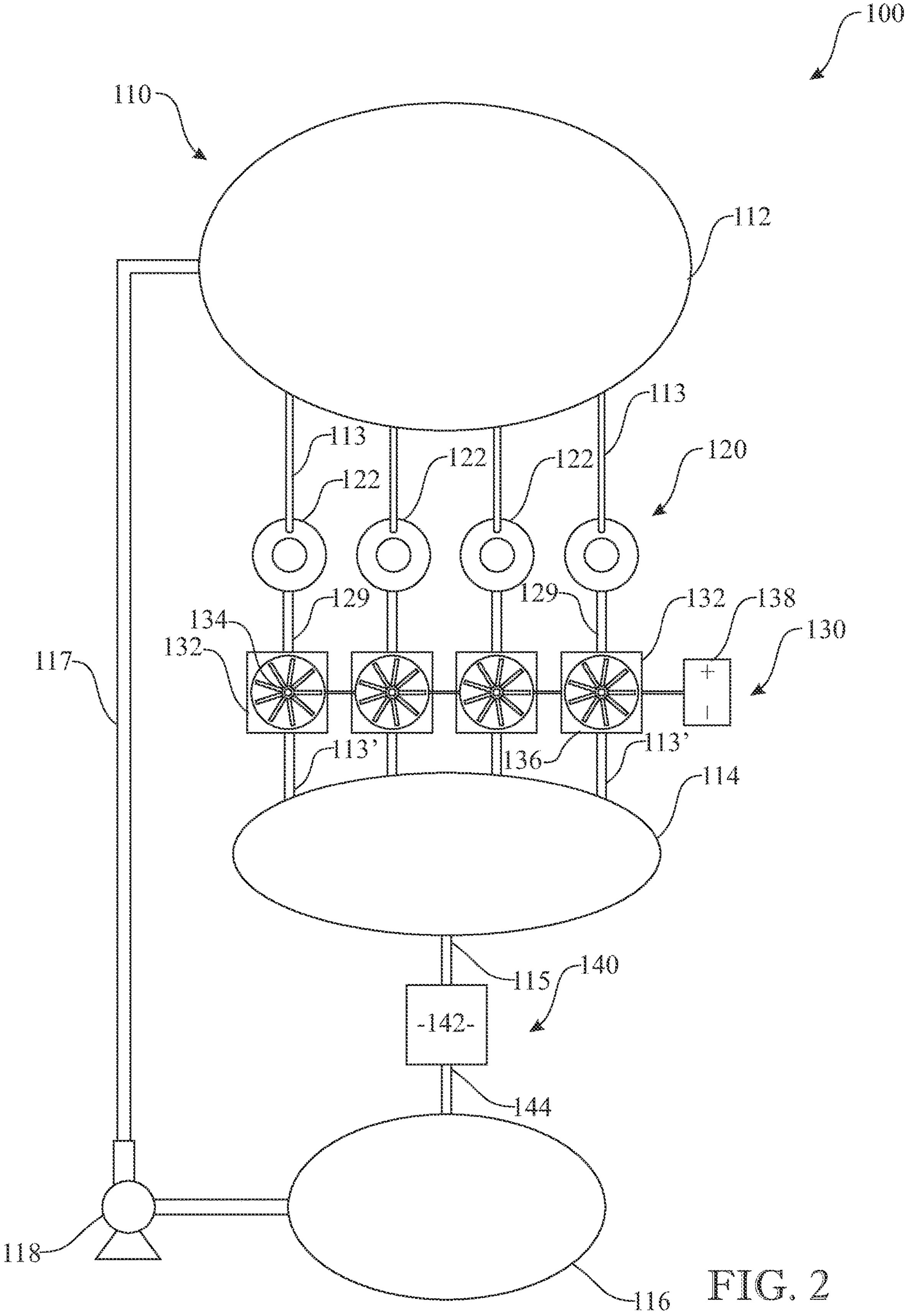
FIG. 2 presents a top plan view of one illustrative embodiment of a self-contained hydroelectricity generating system, in accordance with the present invention.

Referring initially to FIGS. 1 and 2, presented therein are elevation and top plan views, respectively, of one illustrative embodiment of a self-contained hydroelectricity generating system 100 to produce an amount of usable electrical energy, in accordance with the present invention. As shown in the figures, the present self-contained hydroelectricity generating system 100 includes a cistern assembly 110 having a plurality of cisterns. The cistern assembly 110 allows the present hydroelectric generation system 100 to be self-contained. More in particular, unlike a hydroelectric dam system which relies upon the impeded flow of water in a river or stream to be stored in a reservoir for a single pass through a hydroelectric generating station, the cistern assembly 110 of the present system 100 provides storage for a large volume of a motive fluid, such as water, fresh water, etc., to be recirculated through the system 100 over and over again. As will be appreciated, a significant advantage of the present invention is the elimination of the need to impede the natural flow of rivers and streams into reservoirs, which has proven to be harmful, if not disastrous, to the environment along entire river basins. In fact, numerous hydroelectric dam systems are being dismantled and/or removed around the world in an attempt to restore the natural flow of at least portions of some rivers, in the hopes that the environment will recover once natural flow is restored.

In at least one embodiment, a cistern assembly 110 in accordance with the present invention includes at least a primary cistern 112 and a secondary cistern 114. In such an embodiment, an amount of a motive fluid, such as, once again, by way of example only, water, fresh water, etc., is stored in a primary cistern 112 for distribution therefrom into the other components of the self-contained hydroelectricity generating system 100. The motive fluid is subsequently discharged into and temporarily stored in a secondary cistern 114 prior to transfer back into the primary cistern 112. Thus, with the exception of minor losses due to evaporation, spillage or leaks which require only nominal amounts of a motive fluid to be replenished, the present hydroelectric generation system 100 is self-contained.

As will be appreciated, a primary cistern 112 may be designed to contain wide ranging amounts of a motive fluid, depending on the electrical energy generating needs of a self-contained hydroelectricity generating system 100, in accordance with the present invention. As one example, a primary cistern 112 can have a capacity of 100,000 gallons. As another example, a primary cistern 112 has a capacity of one million gallons. In one embodiment, a primary cistern 112 is dimensioned to contain about ten million gallons of a motive fluid, and in yet another embodiment, a primary cistern 112 is dimensioned to contain about fifty million gallons of a motive fluid. A secondary cistern 114 in accordance with the present invention need only be dimensioned to contain a fraction of the volume of a primary cistern 112. In one embodiment, a secondary cistern 114 may be dimensioned to contain about 10% of the amount of motive fluid contained in a primary cistern 112. In another embodiment, a secondary cistern 114 is dimensioned to contain about 20% of the amount of motive fluid contained in a primary cistern 112, and in yet one further embodiment, a secondary cistern 114 is dimensioned to contain about 50% of the amount of motive fluid contained in a primary cistern 112.

With reference once again to FIGS. 1 and 2, in at least one embodiment, a cistern assembly 110 includes a primary cistern 112, a secondary cistern 114 and a tertiary cistern 116. In accordance with the illustrative embodiment, an amount of motive fluid flows from the primary cistern 112 through a hydro-expeditor tower assembly 120 and then through a hydroelectric generator assembly 130, each disclosed and described in complete detail hereinafter. The amount of motive fluid is then discharged into a secondary cistern 114 prior to treatment in a desalinization assembly 140, also described in further detail below, which is then discharged into a tertiary cistern 116, prior to transfer back into the primary cistern 112 for reuse through the present system 100. A tertiary cistern 116 may be dimensioned to contain more, less, or an equal amount of a motive fluid as a secondary cistern 114 in accordance with the present invention. Of course, it is to be appreciated that the relative capacity of a primary cistern 112, a secondary cistern 114 and a tertiary cistern 116 of a cistern assembly 110 in accordance with the present invention may vary depending, once again, on the electrical energy generating needs of a self-contained hydroelectricity generating system 100, in accordance with the present invention.

A primary cistern 112, secondary cistern 114 and tertiary cistern 116 in accordance with the present invention may be formed of compacted soil, concrete, geotextile fabric liners, or other such methods of constructing containments for large volumes of fluid.

It is envisioned that a cistern assembly 110 in accordance with the present invention may be utilized to provide a source of water for a fire control system. This may be particularly useful when a self-contained hydroelectricity generating system 100 in accordance with the present invention is installed in areas know to be subject to seasonal weather patterns conducive to producing wildfires, and well as adjacent metropolitan areas. It is also envisioned that a cistern assembly 110 in accordance with the present invention may be utilized to provide a source of water for a drought relief system. This may be particularly useful when a self-contained hydroelectricity generating system 100 in accordance with the present invention is installed in areas known to be subject to seasonal or long-term drought conditions, such as are currently being experienced in the western United States, and elsewhere around the world.

A self-contained hydroelectricity generating system 100, in accordance with the present invention, further comprises a hydro-expeditor tower assembly 120, as stated hereinabove. A hydro-expeditor tower assembly 120 in one embodiment includes at least one spiral hydro-expeditor tower 122 disposed in fluid communication with a primary cistern 112. In at least one further embodiment of the present invention, a hydro-expeditor tower assembly 120 comprises a plurality of spiral hydro-expeditor towers 122 disposed in fluid communication with the primary cistern 112, such as via one or more primary discharge pipes 113, as shown in the illustrative embodiments of FIGS. 1 and 2. By way of example only, a hydro-expeditor tower assembly 120 in accordance with an embodiment of the present invention may include as many as ten, twenty, forty, sixty or more spiral hydro-expeditor towers 122, each disposed in fluid communication with the primary cistern 112.

Figure 3:
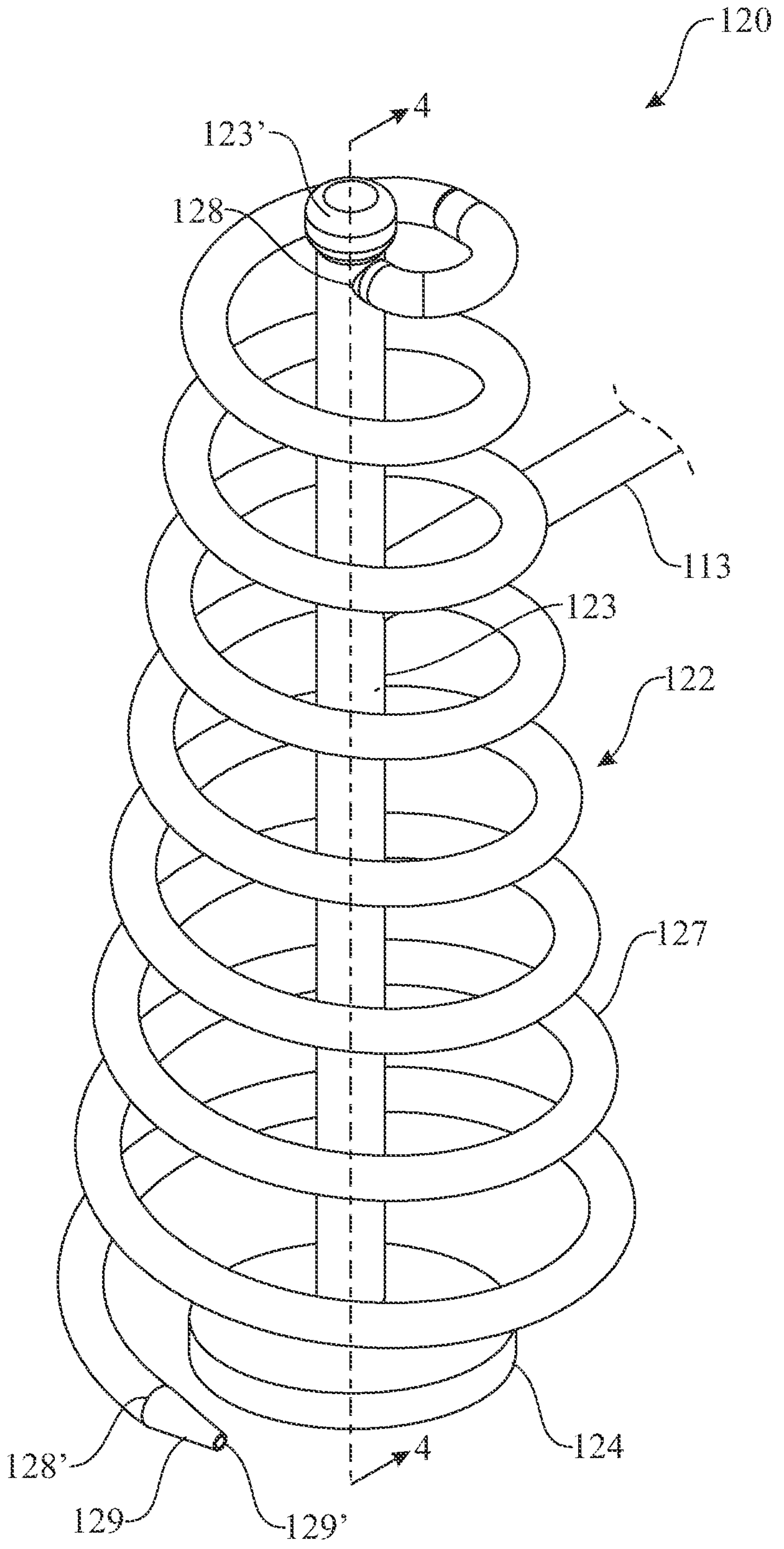
FIG. 3 presents a perspective view of one illustrative embodiment of a spiral hydro-expeditor tower of a self-contained hydroelectricity generating system, in accordance with the present invention.
Figure 4:
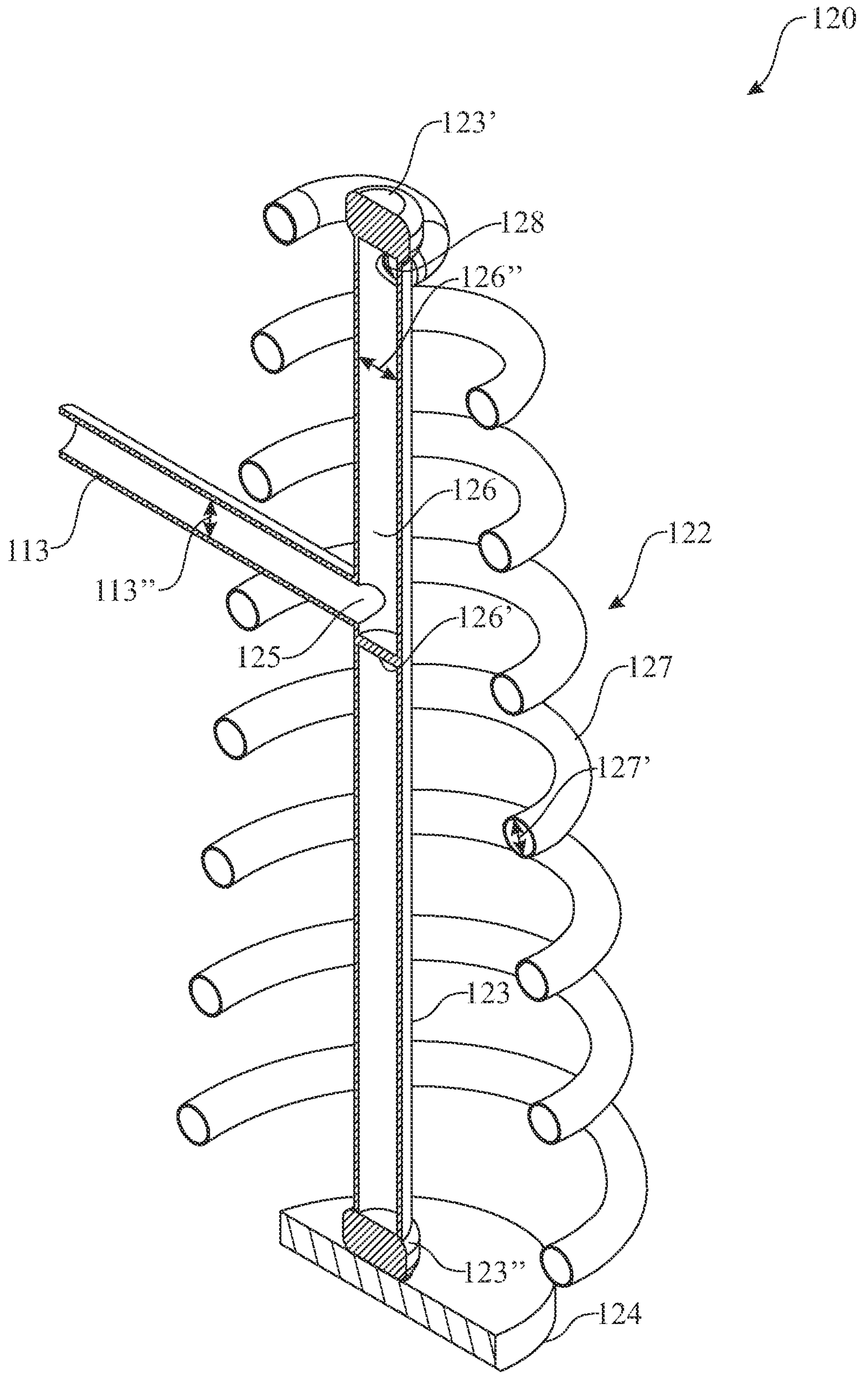
FIG. 4 presents a cross-sectional view of the spiral hydro-expeditor tower of FIG. 3 along lines 4-4 thereof, in accordance with the present invention.

With reference to FIGS. 3 and 4, presented therein are perspective and cross-sectional views, respectively, of one illustrative embodiment of a spiral hydro-expeditor tower 122 in accordance with the present invention. A spiral hydro-expeditor tower 122 includes a central support 123 secured to a base 124. In at least one embodiment, a base 124 and central support 123 are dimensioned and configured such that a spiral hydro-expeditor tower 122 in accordance with the present invention is a free-standing structure. An expeditor conduit 127 is attached to the central support 123 proximate a top 123' thereof. An expeditor conduit 127 may be constructed from any of a number of fluid impervious materials including metals, metal alloys, plastics and/or engineered plastics, fiberglass, etc., just to name a few. As will be appreciated, an expeditor conduit 127 may be dimensioned to accommodate a wide range of motive fluid flow therethrough, as before, depending on the electrical energy generating needs of the present self-contained hydroelectricity generating system 100. By way of example only, an expeditor conduit 127 may have an inner diameter 127' of about four inches to about twenty-four inches. In at least one embodiment, an expeditor conduit 127 has an inner diameter 127' of about twelve inches while a corresponding primary discharge pipe 113 may have an inner diameter 113" of about twenty-four inches.

As shown best in FIG. 3, an expeditor conduit 127 in at least one embodiment comprises an expanding spiral configuration extending downwardly from the top 123' of the central support 123 towards the base 124 of the spiral hydro-expeditor tower 122. As further shown in FIG. 3, the expeditor conduit 127 is configured to extend downwardly from the top 123' of the central support 123 at a predetermined downward pitch while forming a continuous spiral having a constantly increasing diameter. In one embodiment, a predetermined downward pitch is about five degrees to about twenty-five degrees, and in one further embodiment, a predetermined downward pitch is about ten degrees. As will be appreciated, the expanding spiral configuration of the expeditor conduit 127 disposed at a predetermined downward pitch will result in a considerable increase in the velocity of a motive fluid flowing downwardly therethrough.

A spiral hydro-expeditor tower 122 in accordance with the present invention includes a tower inlet 125 dimensioned and configured to receive an amount of a motive fluid from a primary cistern 112 via a primary discharge pipe 113. Looking to the cross-sectional view of FIG. 4, in one embodiment, a tower inlet 125 is disposed through a portion of the central support 123 and into fluid communication with a tower inlet channel 126. With continued reference to FIG. 4, the tower inlet 125 is disposed through the central support 123 and is positioned about two-thirds of the length of the central support 123 up from the bottom 123" of the central support 123 towards the top 123' of the central support 123. In at least one embodiment, a channel plug 126' is positioned just below the tower inlet 125 to seal the bottom of the tower inlet channel 126 so as to prevent a motive fluid from entering and stagnating in the portion of the central support 123 disposed below the tower inlet 125. As will be appreciated, a tower inlet 125 may be disposed at any of a number of positions along the length of the central support 123 provided there is sufficient hydraulic head in a primary cistern 112 to facilitate gravity flow from the primary cistern 112 into and through the spiral hydro-expeditor tower 122 via primary discharge pipe 113.

An expeditor inlet 128 is formed through a portion of the central support 123 proximate the top 123' thereof. An upper end of an expeditor conduit 127 is mounted around and about the expeditor inlet 128, thereby disposing the expeditor conduit 128 into fluid communication with the tower inlet channel 126, and thus, into fluid communication with the motive fluid discharged thereinto from the primary cistern 112 via primary discharge pipe 113. In at least one embodiment, a primary discharge pipe 113 has an inner diameter 113" of about twenty-four inches, a tower inlet channel 126 has an inner diameter 126" of about eighteen inches, and an expeditor conduit 127 has an inner diameter 127' of about twelve inches. As will be appreciated, one or more manual or automatic valves may be installed in the primary discharge pipe(s) 113 so as to permit the amount of motive fluid flowing into the spiral hydro-expeditor tower(s) 122 to be increased or decreased as dictated by the electrical energy generating needs of the present self-contained hydroelectricity generating system 100, or to be discontinued altogether, such as may be necessary for maintenance and/or repairs.

An expeditor outlet 128' is present at the lowermost end of an expeditor conduit 127 through which the amount of motive fluid flowing through a spiral hydro-expeditor tower 122 in accordance with the present invention is discharged. As discussed hereinabove, the expanding spiral configuration of the expeditor conduit 127 disposed at a predetermined downward pitch will result in a considerable increase in the velocity of a motive fluid flowing down therethrough and discharged therefrom. In at least one embodiment, a spiral hydro-expeditor tower 122 further comprises a discharge nozzle 129 mounted around and about an expeditor outlet 128' of an expeditor conduit 127. More in particular, a discharge nozzle 129 includes a discharge aperture 129' having a diameter which is substantially less than an inner diameter 127' of a corresponding expeditor conduit 127, so as to significantly increase the velocity of the motive fluid being discharged therethrough. In one embodiment, a discharge aperture 129' of a discharge nozzle 129 has a diameter that is about one-tenth the inner diameter 127' of an expeditor conduit 127 to which it is mounted. In another embodiment, a discharge aperture 129' of a discharge nozzle 129 has a diameter that is about one-third the inner diameter 127' of an expeditor conduit 127 to which it is mounted. In still one further embodiment, a discharge aperture 129' of a discharge nozzle 129 has a diameter that is about one-sixth the inner diameter 127' of an expeditor conduit 127 to which it is mounted. More in particular, in at least one embodiment, a discharge aperture 129' has a diameter of about two inches while an expeditor conduit 127 has an inner diameter of about twelve inches. The importance of the increase in velocity of the motive fluid discharged from a spiral hydro-expeditor tower 122 in accordance with the present self-contained hydroelectricity generating system 100 will become readily apparent in view of the disclosure of a hydroelectric generator assembly 130 presented immediately hereinafter.

As stated above, a self-contained hydroelectricity generating system 100 further comprises a hydroelectric generator assembly 130, such as is shown by way of example in the illustrative embodiments of FIGS. 1 and 2. A hydroelectric generator assembly 130 in accordance with the present invention includes at least one hydroelectric generator unit 132 disposed in fluid communication with a hydro-expeditor tower assembly 120. More in particular, a hydroelectric generator unit 132 includes a turbine 134 disposed in contact with the flow of motive fluid discharged from a spiral hydro-expeditor tower 122, in accordance with at least one embodiment of the present invention, the contact of the motive fluid thereby causing the turbine 134 to rotate. As will be appreciated, the greater the volume and/or velocity of the motive fluid discharged from a spiral hydro-expeditor tower 122, the faster the turbine 134 of the hydroelectric generator 132 will rotate.

Further, a hydroelectric generator unit 132 includes a hydroelectric generator 136 having a rotor and stator (not shown) disposed in an electrical generating arrangement with one another, such as is known. More in particular, rotation of the rotor while disposed in an electrical generating arrangement with the stator of a hydroelectric generator 136 generates an amount of usable electrical energy, which may be accessed via electric energy output 138. In at least one embodiment, at least one hydroelectric generator unit 132 includes a turbine 134 disposed in an operative engagement with a hydroelectric generator 136, wherein operative engagement is at least partially defined by a rotor of the hydroelectric generator 136 being interconnected to the turbine 134, such as, by way of example, via a shaft and bearing assembly, such that the rotor rotates with the turbine 134.

As will thus be appreciated, the force of contact of the amount of motive fluid discharged from a spiral hydro-expeditor tower 122 with a turbine 134, in accordance with at least one embodiment of the present invention, causes the turbine 134 to rotate which thus causes rotation of a rotor interconnected thereto and disposed in an electrical generating arrangement with a stator of a hydroelectric generator 136, thereby generating an amount of usable electrical energy. As will be further appreciated, the faster a turbine 134 rotates, the faster an interconnected rotor will rotate relative to a corresponding stator, and therefore, a greater amount of usable electric energy will be generated.

Once an amount of a motive fluid is discharged via gravity from a primary cistern 112 through one or more primary discharge pipes 113, into and through one or more spiral hydro-expeditor towers 122 of a hydro-expeditor tower assembly 120, into and through one or more corresponding hydroelectric generator units 132 of a hydroelectric generator assembly 130, it is discharged, also via gravity, into a secondary cistern 114 through one or more primary discharge pipes 113', such as is shown by way of example in the illustrative embodiments of FIGS. 1 and 2.

In at least one embodiment, the amount of motive fluid discharged into a secondary cistern 114 is returned to a primary cistern 112 via one or more recirculation pumps. In at least one further embodiment, the amount of motive fluid discharged into a secondary cistern 114 is transferred, once again, via gravity, to a desalination assembly 140, and more in particular, to a desalination unit 142 of a desalination assembly 140. As will be appreciated, a desalination unit 142 may be provided to remove excess salts and amounts of other dissolved minerals from a motive fluid, such as water or sea water. As will be further appreciated, salts and/or other dissolved minerals may be corrosive to certain components of as fluid handling system, such as the present self-contained hydroelectricity generating system 100, therefore, providing a desalination assembly 140 to reduce if not altogether remove potentially corrosive salts and/or other dissolved minerals from a motive fluid will necessarily serve to extend the useful life of a system 100 in accordance with the present invention.

With reference once again to FIGS. 1 and 2, in at least one embodiment, after a motive fluid has been treated in a desalination unit 142 it is discharged, as before, via gravity into the tertiary cistern 116 through a desalination discharge pipe 144. With reference specifically to the elevation presented in the illustrative embodiment of FIG. 1, while clearly not to scale, the relative elevation of each of the components of one embodiment of a self-contained hydro-electricity generating system 100 in accordance with the present invention are shown so as to facilitate gravity flow of an amount of a motive fluid therethrough. Specifically, a motive fluid flows solely via gravity from a primary cistern 112 into and through one or more spiral hydro-expeditor towers 122 of a hydro-expeditor tower assembly 120, into and through one or more corresponding hydroelectric generator units 132 of a hydroelectric generator assembly 130, into and through a secondary cistern 114, into and through a desalination unit 142, and finally, into a tertiary cistern 116, once again, solely by the force of gravity.

As further shown in the illustrative embodiment of FIGS. 1 and 2, a tertiary recirculation pump 118 is provided to transfer the amount of motive fluid from the tertiary cistern 116 to the primary cistern 112 through a tertiary recirculation pipe 117. It will be appreciated that a plurality of tertiary recirculation pumps 118 and/or a plurality of tertiary recirculation pipes 117 may be provided to transfer the amount of motive fluid from the tertiary cisterns 116 to the primary cistern 112. It is to be further appreciated that, as stated above, with the exception of minor losses due to evaporation, spillage or leaks, which may require nominal amounts of a motive fluid to be replenished, the present hydroelectric generation system 100 is self-contained, thereby eliminating the need to impede the natural flow of rivers and streams into reservoirs which, once again, has proven to be harmful, and in some instances, disastrous, to the environment along entire river basins.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A self-contained hydroelectricity generating system to produce an amount of usable electrical energy, said system comprising:

a cistern assembly comprising a primary cistern and a secondary cistern, said primary cistern dimensioned to contain an amount of a motive fluid therein;

a hydro-expeditor tower assembly having at least one spiral hydro-expeditor tower disposed in fluid communication with said primary cistern, a portion of said amount of said motive fluid flows from said primary cistern into said at least one hydro-expeditor tower, wherein a velocity of said portion of said amount of said motive fluid increases as the motive fluid flows downward through said at least one hydro-expeditor tower;

a hydroelectric generator assembly comprising at least one hydroelectric generator unit having a turbine and a hydroelectric generator comprising a rotor disposed in an electrical generating arrangement with a stator;

said hydroelectric generator assembly disposed in fluid communication with said hydro-expeditor tower assembly, said portion of said amount of said motive fluid discharged from said hydro-expeditor tower assembly contacts said turbine causing rotation thereof;

said turbine is disposed in an operative engagement with said hydroelectric generator at least partially defined by said rotor interconnected to said turbine such that said rotor rotates with said turbine, rotation of said rotor disposed in said electrical generating arrangement with said stator generates said amount of usable electrical energy;

said secondary cistern disposed in fluid communication with said hydroelectric generator assembly, said portion of said amount of said motive fluid is discharged from said hydroelectric generator assembly to said secondary cistern after contacting said turbine;

each said corresponding portion of said amount of said motive fluid is transferred from said secondary cistern to a desalination assembly; and each said corresponding portion of said amount of said motive fluid is transferred from said desalination assembly to said primary cistern after desalination for reuse thereof.

2. The system as recited in claim 1, wherein said motive fluid is water.

3. The system as recited in claim 1, wherein said motive fluid is fresh water.

4. The system as recited in claim 1, wherein said primary cistern is dimensioned to contain about ten million gallons to about fifty million gallons.

5. The system as recited in claim 1, wherein said cistern assembly comprises a fire control system configured to expunge flames through the utilization of the said amount of motive fluid.

6. The system as recited in claim 1, further comprises a draught relief system wherein a draught relief portion of said amount of said motive fluid in said cistern assembly is utilized for said draught relief system.

7. The system as recited in claim 1, wherein said secondary cistern is dimensioned to contain about five million gallons to about twenty million gallons of said motive fluid.

8. The system as recited in claim 1, wherein said at least one spiral hydro-expeditor tower comprises an expeditor conduit arranged in a downward spiral configuration having a predetermined downward pitch between a top of said at least one spiral hydro-expeditor tower to a bottom of said at least one spiral hydro-expeditor tower.

9. The system as recited in claim 8, wherein said at least one spiral hydro-expeditor tower has a vertical elevation of about seventy feet from said top to said bottom.

10. The system as recited in claim 8, wherein said predetermined downward pitch is about ten degrees.

11. The system as recited in claim 8, wherein said expeditor conduit comprises an expeditor inlet disposed proximate said top of said at least one spiral hydro-expeditor tower and an expeditor outlet disposed proximate said bottom of said at least one spiral hydro-expeditor tower.

12. The system as recited in claim 11, wherein said at least one spiral hydro-expeditor tower comprises a discharge nozzle mounted to said expeditor outlet to further accelerate said velocity of said portion of said amount of said motive fluid discharged therethrough.

13. The system as recited in claim 12, wherein said expeditor conduit comprises an inner diameter of about twelve inches.

14. The system as recited in claim 12, wherein said discharge nozzle has a discharge aperture having a diameter of about two inches.

15. A self-contained hydroelectricity generating system to produce an amount of usable electrical energy, said system comprising:

a cistern assembly comprising a primary cistern and a secondary cistern, said primary cistern dimensioned to contain an amount of a motive fluid therein;

a hydro-expeditor tower assembly having a plurality of spiral hydro-expeditor towers each disposed in fluid communication with said primary cistern, a portion of said amount of said motive fluid flows from said primary cistern into each of said plurality of hydro-expeditor towers, wherein a velocity of a corresponding portion of said amount of said motive fluid increases as the motive fluid flows through each of said plurality of hydro-expeditor towers;

a hydroelectric generator assembly comprising a plurality of hydroelectric generator units each having a turbine and an electrical generator comprising a rotor disposed in an electrical generating arrangement with a stator;

said hydroelectric generator assembly disposed in fluid communication with said hydro-expeditor tower assembly, said corresponding portion of said amount of said motive fluid discharged from each of said plurality of spiral hydro-expeditor towers contacts said turbine of a corresponding one of said plurality of hydroelectric generator units causing rotation thereof;

each said turbine is disposed in an operative engagement with a corresponding one of said hydroelectric generators, wherein said operative engagement is at least partially defined by each said rotor interconnected to a corresponding one of said turbines such that said rotor rotates with said turbine, and rotation of each said rotor disposed in said electrical generating arrangement with a corresponding one of said stators results in generation of said amount of usable electrical energy;

said secondary cistern disposed in fluid communication with said hydroelectric generator assembly, said corresponding portion of said amount of said motive fluid is discharged from each of said plurality of hydroelectric generator units to said secondary cistern after contacting said turbine corresponding therewith;

each said corresponding portion of said amount of said motive fluid is transferred from said secondary cistern to a desalination assembly; and each said corresponding portion of said amount of said motive fluid is transferred from said desalination assembly to said primary cistern after desalination for reuse thereof.

16. The system as recited in claim 15, wherein each of said plurality of spiral hydro-expeditor towers comprises an expeditor conduit arranged in a downward spiral configuration having a predetermined downward pitch between a top and a bottom of a corresponding one of each of said plurality of spiral hydro-expeditor towers.

17. The system as recited in claim 16, wherein each of said plurality of spiral hydro-expeditor towers has a vertical elevation of about seventy feet from a corresponding one of said top to said bottom.

18. The system as recited in claim 15, wherein said hydro-expeditor tower assembly comprises forty spiral hydro-expeditor towers.

19. The system as recited in claim 15, wherein said hydroelectric generator assembly comprises forty hydroelectric generator units.

* * * * *